Nov. 6, 1956  J. C. WAGNER  2,769,501
BUMPER, RADIATOR, AND GRILLE ASSEMBLY
FOR SECTIONAL VEHICLE CAB
Filed Oct. 9, 1952  3 Sheets-Sheet 1
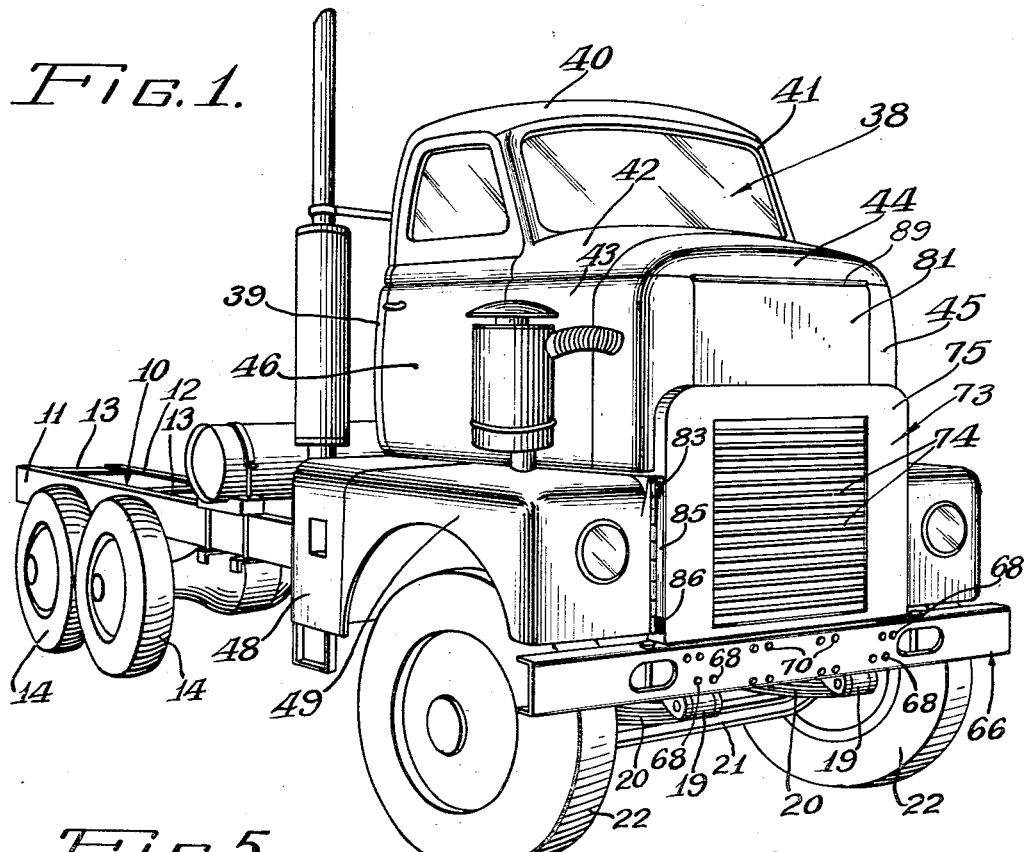
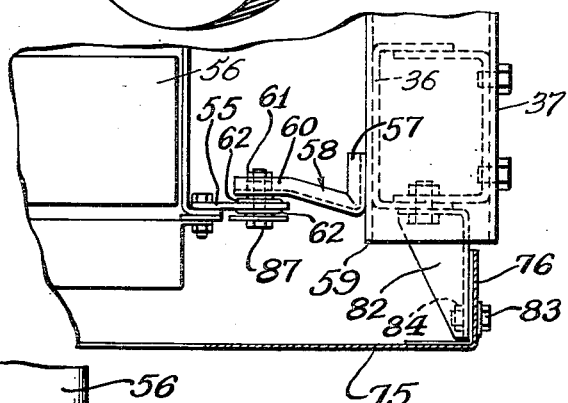
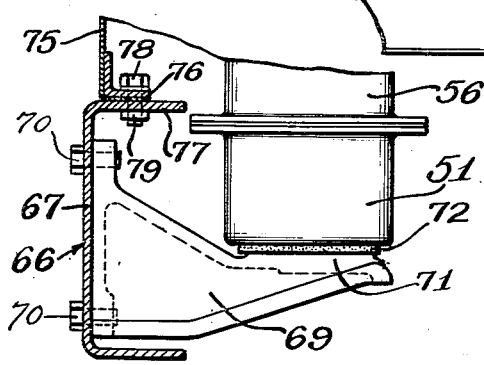
Inventor:
John C. Wagner
Paul O. Pippel
Atty.

Nov. 6, 1956 — J. C. WAGNER — 2,769,501
BUMPER, RADIATOR, AND GRILLE ASSEMBLY FOR SECTIONAL VEHICLE CAB
Filed Oct. 9, 1952

FIG. 2.

Inventor:
John C. Wagner
Paul O. Pipper
Atty.

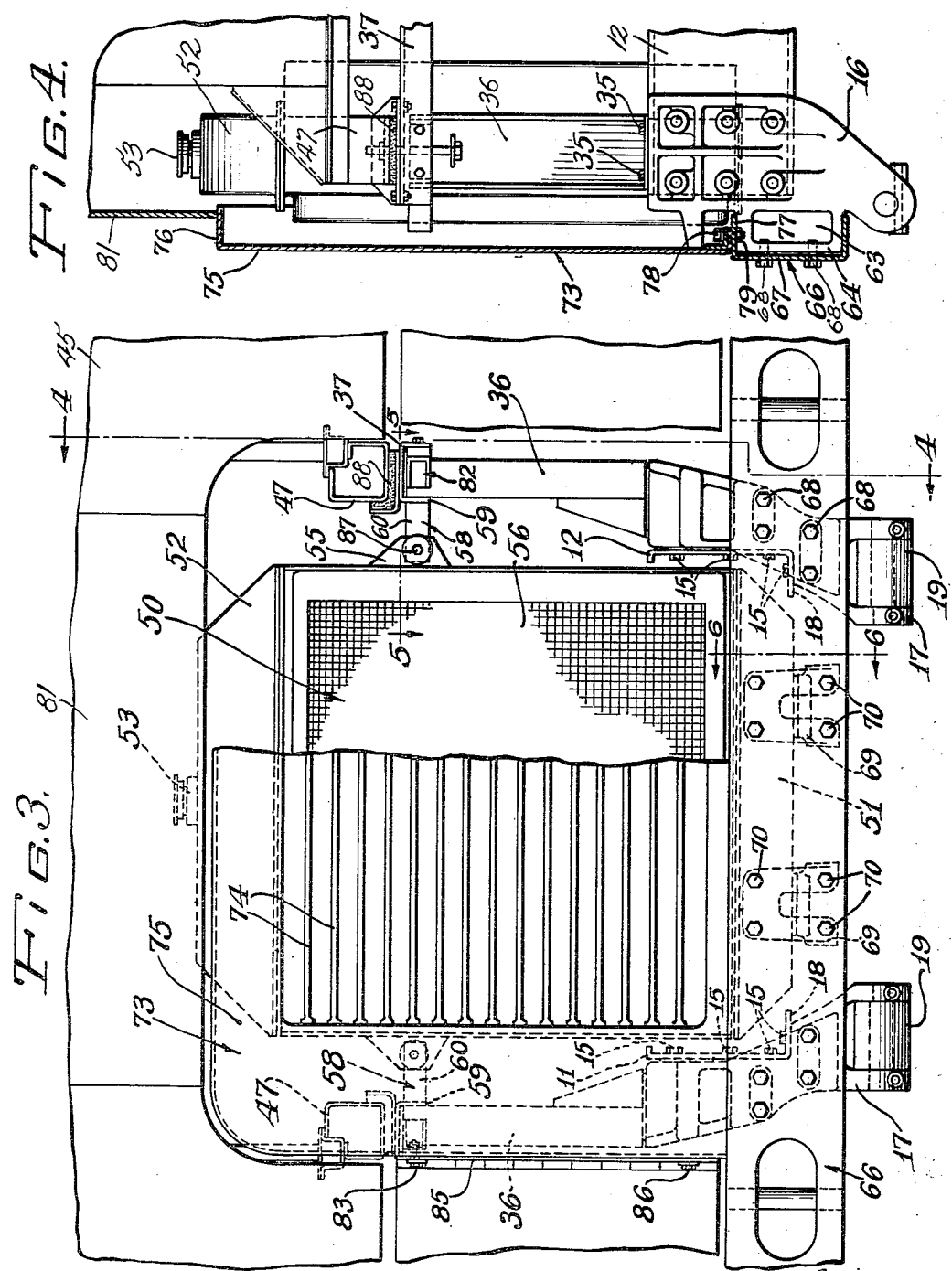

United States Patent Office 2,769,501
Patented Nov. 6, 1956

2,769,501

BUMPER, RADIATOR, AND GRILLE ASSEMBLY FOR SECTIONAL VEHICLE CAB

John C. Wagner, Berkeley, Calif., assignor to International Harvester Company, a corporation of New Jersey Application October 9, 1952, Serial No. 313,832

7 Claims. (Cl. 180—68)

This invention relates to improvements in motor trucks and more particularly to motor trucks of the cab-over-engine type.

Motor truck manufacturers have for many years, striven to increase the length of the load carrying portion of the chassis frame without materially increasing the over-all length of the truck. The so called "cab-over-engine" type motor truck was developed in order to comply with the public demand for a truck having a greater pay-load capacity without the necessity of increasing the overall length of the chassis frame when compared with frames of conventional motor trucks. The increased pay-load capacity is obtained in the cab-over-engine type trucks by mounting the vehicle body over the engine or power plant rather than rearwardly therefrom as in the construction of conventional trucks with the result that a portion of the space normally occuiped by the vehicle body is available for carrying cargo and better load distribution on the axles is obtained.

While the cab-over-engine type motor truck design possesses many advantages over conventional type motor trucks it has one distinct inherent disadvantage. Convenient accessibility to the engine for minor adjustments and major repairs is seriously affected and is rendered difficult because of the relatively close confinement of the engine beneath the vehicle cab or body. It is, therefore, the primary objective of the present invention to obviate the above mentioned disadvantage by providing a plurality of vehicle cab parts and structures enclosing the engine which are constructed and arranged in a novel manner and are coordinated with each other so as to be quickly and easily disassembled from the chassis frame to facilitate engine attendance and making repairs thereto.

A further object is the provision of a vehicle sub-assembly structure including a bumper, radiator core, and radiator grille which is quickly and easily attached to or detached from the vehicle chassis frame as a unit to enclose or gain access to the engine.

Another object is to provide novel means for connecting certain vehicle engine enclosing parts together whereby the parts may be readily disconnected from each other and the chassis frame.

The foregoing and other important objects and desirable features inherent in and encompassed by the invention, together with many of the purposes and uses thereof will become readily apparent from a reading of the ensuing description in conjunction with the annexed drawings, in which Figure 1 is a persective view of a motor truck embodying the invention;

Figure 2 is a front elevational view of the motor truck shown in Figure 1 with the bumper, radiator core, radiator and fenders detached from the chassis frame;

Figure 3 is a detailed, fragmentary view of the bumper, radiator core, and grille unit;

Figure 4 is a sectional view taken substantially along line 4—4 of Figure 3;

Figure 5 is an enlarged sectional view taken substantially along line 5—5 of Figure 3; and Figure 6 is a sectional view taken substantially along line 6—6 of Figure 3.

Referring to the drawings, wherein like reference characters designate like elements throughout the various views, there is shown a motor truck chassis frame 10 which includes a pair of transversely spaced, longitudinally extending, channel-shaped side sill members 11 and 12. The side sill members 11, 12 are interconnected along their lengths by a plurality of cross members 13.

As shown in Figure 1, the rearwardly disposed end of the chassis frame 10 is supported off the ground by power driven ground-engaging wheels 14 which are resiliently connected thereto by leaf springs (not shown) in a conventional manner. Attached to the extreme forward end of each sill member 11 and 12, by means of bolts 15, is a bracket 16. It will be noted that each bracket 16 has a bifurcated portion 17 depending below the horizontal plane containing the lower flanges 18 of the side sill members 11, 12. The bifurcated portion 17 of each bracket 16 supports a pin to which the forward end 19 of a leaf spring assembly 20 is pivotally connected. The opposite end of the leaf spring assemblies 20 are connected to the chassis frame 10 in a conventional manner. The spring assemblies 20 are rigidly connected to an axle 21 on which steerable wheels 22 are rotatably mounted.

The forward end of the vehicle power plant or engine, designated generally by the numeral 33, is resiliently mounted on a transversely extending bar 34 at the forward end of the chassis frame 10 between the side sill members 11 and 12. Fastened to the top surface of each bracket 16 by means of bolts 35 is a channel shaped upright member 36. Similar upright members (not shown), rearwardly spaced from members 36, are rigidly fastened to the side sill members 11 and 12. An element 37, having an inverted U-shaped cross section, extends between and is secured to the upper end of each member 36 and the upright member spaced rearwardly thereof. The upright members and the elements serve as the sub-frame for the vehicle body or operator's compartment 38.

The operator's compartment 38 includes a back panel 39 joined to a roof 40 which, in turn, is connected to a windshield frame 41. The windshield frame 41 is integrally formed with an inverted U-shaped cowl panel 42. Secured to the cowl panel 42 are depending side panels 43 and a front section 44. The forward wall 45 of the front section 44 has a relatively large opening formed therein through which many of the engine accessories may be easily repaired or adjusted. A pair of doors 46 are pivotally mounted to door pillar posts (not shown) adjacent the rearward edge of the side panels 43. It is to be understood that suitable braces and ribs are used to interconnect the various body parts enumerated above to increase the strength and rigidity of the assembled operator's compartment 38. Running the length of the operator's compartment 38 along the lower edge of each side thereof is a cab frame member 47 to which the assembled operator's compartment is attached. The forward ends of the cab frame members 47 are resiliently connected to elements 37, by means of pads 88 made of rubber or other suitable material, directly above the forwardly disposed upright members 36. It is to be understood that the rearward portion of the operator's compartment is also resiliently connected to the sub-frame. Attached to each side of the sub-frame adjacent the lower edge of the back panel 39 is a fender section 48 which cooperates with a mating movable fender section 49 (to be described hereinafter in detail) to form a fender or wheel covering for one of the steerable wheels 22.

Spaced forwardly of the engine driven fan is a radiator core 50 which is constructed in a conventional manner and includes a lower header 51 and an upper header 52 provided with a water filling opening closed with a removable cap 53. The upper and lower headers 51, 52 are also provided with openings (not shown) for receiving and discharging cooling liquid from and to the engine 33 through flexible conduits 54 (only one is shown in Figure 2). As best shown in Figures 3 and 5, an arm 55, secured to the intermediate cooling section 56 of the radiator core 50, extends transversely from each side of the core 50. Each arm 55 is provided with an aperture through which a bolt 87 is adapted to extend. The legs 57 of each of L-shaped stabilizer brackets 58 are rigidly connected to the inboard flanges 59 of respective elements 37. The other legs 60 of the brackets 58 extend inwardly and each terminate in the vicinity of a respective arm 55. As best illustrated in Figure 5, the bolts 87 project through the legs 60 and nuts 61 are engageable with the threaded portions of the bolts to clamp the arm 55 to the stabilizer brackets 58. Suitable pads or grommets 62 of resilient material such as rubber are interposed between the arms 55 and the brackets to prevent metal to metal contact and to allow a slight degree of relative movement between the connected parts.

Referring to the construction of the brackets 16, it will be noted that each bracket has a hollow portion 63 projecting forwardly of the forward terminal ends of the side sill members 11 and 12. The forward wall 64 of each portion 63 has four threaded apertures 65 formed therein for a purpose which will be explained presently. The front bumper 66, as shown in Figures 4 and 6 is U-shaped in vertical cross section and the web section 67 thereof is adapted to abut the forward walls 64 of the bracket portions 63. The bumper 66 is provided with eight apertures which are registerable with the threaded apertures 65 formed in the forward walls 64 when the bumper is positioned on the brackets 16, as illustrated in Figures 3 and 4. Eight bolts 68 are insertable through the apertures in the bumper 66 and are engageable with the threaded apertures 65 for detachably securing the bumper to the chassis frame 10. It will be observed that the eight bolts 68 constitute the sole means for connecting the bumper 66 to the chassis frame 10 and are each conveniently located on the front face of the bumper for removal therefrom to detach the bumper from the chassis frame. The bumper 66 also carries a pair of transversely spaced supporting brackets 69, which are disposed between the brackets 16 when the bumper is assembled on the chassis frame 10. The supporting brackets 69 are secured to the bumper 66 by means of bolts 70 and each has a flat portion 71 disposed directly below the lower header 51. Interposed between the flat portion 71 and the lower header 51 of the radiator core 50 are pads 72 of resilient material secured to the brackets 69 by any suitable means. From the foregoing it will be obvious that the entire weight of the radiator core 50 is transmitted to the chassis frame 10 through the brackets 69 and bumper 66, and the connections of the radiator core 50 to the stabilizer brackets 58, described above, merely maintain the radiator core in an upright position over the flat portions 71 of the brackets 69.

The radiator grille or guard 73 in the present invention is mounted directly upon the bumper 66 and includes a series of horizontally extending bars 74 having their ends secured to opposite sides of a rectangular frame 75. The peripheral edge of the frame 75 is defined by a rearwardly extending flange 76. As best shown in Figures 4 and 6, a portion of the flange 76 abuts the top flange 77 of the bumper 66 and is provided with a plurality of spaced apertures registerable with apertures formed in the bumper top flange 77 through which bolts 78 extend.

Suitable locknuts 79, engageable with the bolts 78, are used to clamp the bumper 66 and the radiator grille 73 together.

As illustrated in Figure 1, the frontal area of the operator's compartment 38 is substantially covered by the radiator guard 73 when assembled on the chassis frame 10 with the exception of the upper portion 80 of the opening in the forward wall 45 of the front section 44. The upper portion 80 is normally closed by a door 81 having its upper edge pivotally connected to the front section 44 for swinging movement about a horizontal, transversely extending axis. The pivotal connection is designated by numeral 89. Latch means (not shown) are employed for securing the door 81 in its closed position which are easily releasable to allow the door to be swung to the position shown in Figure 2 to gain access to the vehicle accessories normally covered thereby.

A forwardly extending bracket 82 is attached to each upright member 36 adjacent the upper ends thereof as shown in Figure 3. The flange 76 overlaps each bracket 82 and is connected to the brackets by bolts 83 and nuts 84 (one of each being shown in Figure 5).

As stated hereinbefore, a fender or wheel covering extends from the back panel 39 to the radiator grille 73 along each side of the sub-frame and includes a relatively short stationary section 48 and a movable section 49. A hinge leaf 85 is pivotally connected to the inner forward edge of each movable section 49. Each hinge leaf 85 is provided with a pair of vertically spaced apertures. Bolts 83 are adapted to extend through the upper apertures formed in the hinge leafs 85 and similar bolts 86 are used to attach the lower ends of the hinge leafs to the flange 76. The details of the fender structure per se are described and claimed in applicant's copending application, Serial No. 313,831, filed on the same day as the present invention, entitled "Pivotally Mounted Vehicle Fender," and assigned to the present assignee, and therefore, will not be disclosed herein. However, it is to be understood that the fenders normally serve as side walls for the structure covering the engine 33 but are swingable away from the sides of the operator's compartment 38 in order to gain access to the engine and accessories.

From the foregoing it will be appreciated that the engine 33 and its accessories are conveniently accessible for minor adjustments and inspections as well as for major repairs. The radiator core 50, radiator grille 73, and the bumper 66 are designed so they can be quickly removed as a sub-assembled unit preparatory for engine removal for major overhaul by simply performing the following steps. The engine cooling system is first drained of the cooling liquid. The movable fender sections 49 are then removed from the chassis frame 10 by disconnecting each section 49 from its respective stationary section 48 and removing bolts 83 and 86. It will be obvious that the removal of bolts 83 also disconnects the flange 76 of the radiator grille 73 from the brackets 82. The cooling liquid inlet and outlet conduits 54 are disconnected from the radiator core 50 and the connections between the arms 55 and the stabilizer brackets 58 are broken by unfastening bolts 87 and nuts 61. The eight bolts 68 on the face of the bumper 66 are disengaged from the brackets 16 and the entire assembly can then be lifted clear of the chassis frame 10 by a chain or boom type hoist. In order to assemble the unit on the chassis frame 10 the above steps are merely reversed.

The embodiments of the invention chosen for the purposes of illustration and description herein is that preferred for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude, but rather to suggest, such other adaptations

What is claimed is:

1. In a cab-over-engine type motor truck having a chassis frame and an engine supported by said frame, the combination including said frame and engine comprising, a vehicle body supported above said engine by said frame, said body including an operator's compartment and a cowl structure extending forwardly from said compartment, portions of said operator's compartment and cowl structure serving as walls of an enclosure for said engine, said structure including an inverted U-shaped cowl panel and a vertically disposed front panel spaced forwardly of said operator's compartment and said engine extending from the top surface of said cowl panel to a horizontal plane containing the lower marginal edges of said cowl panel and serving as a portion of the forwardmost wall of said engine enclosure, said front panel having a forwardly facing opening formed therein, said opening extending vertically from the lower marginal edge of said front panel to a horizontal plane adjacent to but vertically spaced below said top surface of said cowl panel, said opening providing an area for gaining access to said engine within said engine enclosure; a door pivotally mounted adjacent said opening on said front panel for closing the upper portion of said opening; a pre-assembled unit comprising a radiator core disposed forwardly of said operator's compartment, a radiator grille for said radiator core, said radiator grille serving as a portion of the forwardmost wall of said engine enclosure, said radiator grille being disposed between the side walls of said cowl panel and having a portion thereof extending into said opening to partially close the same, said radiator grille being vertically aligned with and having its top marginal edge adjacent the lower marginal edge of said door when said door is in the closed position, said radiator grille and door being adapted to close said opening when said door is closed and said radiator grille is disposed between the side walls of said cowl panel, and a bumper; securing means for attaching said pre-assembled unit to said frame including quick detachable means disposed on the exteriorly facing side of said bumper; and a sectional fender including a major portion and a minor portion disposed along each side of and below said body normally enclosing the side portions of said engine and serving as portions of side walls of said engine enclosure, said minor portion being rigidly connected to said frame adjacent the rear wall of said operator's compartment, said major portion being releasably connected to a respective minor portion and said frame whereby each major portion is quickly detachable to gain access to the side portions of the engine.

2. In a cab-over-engine type motor truck having a chassis frame and an engine supported by said frame, the combination including said frame and engine comprising a vehicle body supported above said engine by said frame and serving as a portion of an enclosure for said engine, said body having a forwardly facing, inverted generally U-shaped opening in one end thereof, said opening providing an area for gaining access to said engine within said engine enclosure; a pre-assembled unit including a radiator core for said engine, a radiator grille for said core, and a bumper supporting said core and grille, said radiator grille being positionable within the opening formed in the said body to partially close said opening and serve as a portion of the forwardmost wall of said engine enclosure; means for securing said pre-assembled unit to said frame including quick detachable means disposed on the exteriorly facing side of said bumper; a pair of fender sections disposed along the sides of and below said body normally enclosing the major side portions of said engine and serving as portions of the side walls of said engine enclosure, each of said fender sections having one end connected to a respective side marginal edge of said radiator grille and its opposite end releasably connected to said frame; and a door pivotally mounted adjacent said opening on said vehicle body for closing a portion of said opening, said door when in its closed position and said radiator grille is positioned within said opening being adapted to close said opening.

3. The combination substantially as set forth in claim 2, in which, said means for attaching said pre-assembled unit to said frame includes bracket means rigidly connected to said frame having a plurality of horizontally disposed threaded apertures formed therein, a vertically disposed, transversely extending wall of said bumper having apertures formed therein registerable with said threaded apertures, and said quick detachable means includes attaching bolts insertable from the exterior side of said vertically disposed, transversely extending wall of said bumper through said bumper apertures and engageable with said threaded apertures for securing said pre-assembled unit to said bracket means.

4. In a cab-over-engine type motor truck having a chassis frame and an engine supported by said frame, the combination including said frame and engine comprising, a vehicle body supported above said engine by said frame, said body including an engine housing structure, said structure including an inverted U-shaped panel and a vertically disposed front panel spaced forwardly of said engine and extending from the top surface of said U-shaped panel to a horizontal plane containing the lower marginal edges of said U-shaped panel and serving as a portion of the forwardmost wall of said engine enclosure, said front panel having an opening therein extending vertically from the lower marginal edge thereof; a pre-assembled unit comprising, radiator means for said engine disposed between the side walls of said U-shaped panel and having an upper portion thereof disposed within said opening, said radiator means being vertically aligned with said front panel and serving as a portion of the forwardmost wall of said engine enclosure, and a bumper; securing means for attaching said radiator means and bumper pre-assembled unit to said frame including quick detachable means, said quick detachable means including elements having portions thereof disposed forwardly and on the exteriorly facing side of said bumper; and a door pivotally mounted on said front panel adjacent said opening for closing a portion of said opening, said door when in its closed position and said upper portion of said radiator means is disposed within said opening being adapted to close said opening.

5. The combination as set forth in claim 4, in which, said means for attaching said radiator means and bumper pre-assembled unit to said frame includes bracket means rigidly connected to said frame having a plurality of threaded apertures formed therein and said bumper having apertures formed therein registerable with said threaded apertures, and said elements comprising attaching bolts insertable through said bumper apertures and engageable with said threaded apertures for securing said radiator means and bumper pre-assembled unit to said bracket means.

6. In a motor truck having a chassis frame and an engine supported by said frame, the combination including said frame and engine comprising, a vehicle body supported above said engine by said frame and partially defining an enclosure for said engine, said body having a forwardly facing, inverted U-shaped opening in one end thereof; a movable door for closing a portion of said opening; a sub-assembly including radiator means for said engine and a bumper supporting said radiator means; and means for attaching said sub-assembly to said frame whereby said radiator means partially extends within said opening formed in said body and partially defines a wall of said engine enclosure, said means for attaching said sub-assembly to said frame affording quick detachment of said sub-assembly to gain access to one end portion of said engine and including a plurality of elements having portions thereof disposed forwardly and on the exteriorly facing side of said bumper, said door when in its closed position and said radiator means extends into said opening being adapted to close said opening.

7. In a cab-over-engine type motor truck having a chassis frame provided with a pair of laterally spaced brackets at the forward end thereof, and an engine supported by said frame contiguous to said brackets, the combination including said frame and engine comprising, an engine enclosure including a pre-assembled unit comprising, an upright radiator means for said engine, said radiator means serving as a portion of a wall of said engine enclosure, and a bumper supporting said radiator means, said bumper being formed with a vertically disposed web portion having vertically spaced horizontally extending flanges defining its upper and lower marginal edges, said brackets being positionable between and abutting said flanges; a door pivotally mounted on said engine enclosure above said radiator means swingable between an open position and a closed position and serving as a wall portion of said engine enclosure when in its closed position; and means for attaching said radiator means and bumper pre-assembled unit to said brackets, said means affording quick detachment of said radiator means and bumper pre-assembled unit to gain access to a portion of said engine and including a plurality of portions thereof disposed forwardly of and on the exteriorly facing side of said web portion of said bumper.

References Cited in the file of this patent

UNITED STATES PATENTS

| | | |
|---|---|---|
| 1,544,858 | Patten | July 7, 1925 |
| 1,795,208 | Garner | Mar. 3, 1931 |
| 2,095,058 | Cross | Oct. 5, 1937 |
| 2,099,789 | Baker et al. | Nov. 23, 1937 |
| 2,151,229 | Piroumoff et al. | Mar. 21, 1939 |
| 2,260,578 | Murray | Oct. 28, 1941 |
| 2,362,453 | Cosper | Nov. 14, 1944 |
| 2,491,800 | Colaner | Dec. 20, 1949 |
| 2,667,230 | Duff et al. | Jan. 26, 1954 |
| 2,699,223 | Brumbaugh | Jan. 11, 1955 |

FOREIGN PATENTS

| | | |
|---|---|---|
| 356,911 | Great Britain | Sept. 17, 1931 |
| 553,185 | Great Britain | May 11, 1943 |

OTHER REFERENCES

Publication, "Commercial Car Journal," vol. 79, issue No. 4, pgs. 78 and 214, publication date June 1950.